April 2, 1946.  E. W. DINGA  2,397,475
METHOD AND APPARATUS FOR CONTROLLING MOVING VEHICLES
Filed Dec. 1, 1939  6 Sheets-Sheet 1

FIG. 1.

INVENTOR.
EMIL W. DINGA
BY Moses & Nolte
ATTORNEYS

April 2, 1946.  E. W. DINGA  2,397,475
METHOD AND APPARATUS FOR CONTROLLING MOVING VEHICLES
Filed Dec. 1, 1939  6 Sheets-Sheet 2

FIG. 2.

INVENTOR.
EMIL W. DINGA
BY
ATTORNEYS

April 2, 1946.  E. W. DINGA  2,397,475
METHOD AND APPARATUS FOR CONTROLLING MOVING VEHICLES
Filed Dec. 1, 1939  6 Sheets-Sheet 5

FIG. 5.

INVENTOR.
EMIL W. DINGA
BY
ATTORNEYS

FIG. 6.

INVENTOR.
EMIL W. DINGA
BY  ATTORNEYS.

Patented Apr. 2, 1946

2,397,475

UNITED STATES PATENT OFFICE 2,397,475

METHOD AND APPARATUS FOR CONTROLLING MOVING VEHICLES

Emil W. Dinga, Long Island City, N. Y., assignor, by mesne assignments, to The W. L. Maxson Corporation, New York, N. Y., a corporation of New York Application December 1, 1939, Serial No. 307,018

15 Claims. (Cl. 250—2)

This invention relates to the control of one or more parts of a device from a remote point by means of electrical impulses and more especially to the control of certain parts of an airplane, ship or other movable vehicle or to a part or parts of an object or objects carried by such vehicle. As illustrations of the use to which the invention is adapted, it may be employed to control the elevators, ailerons and rudder of an airplane, the engine throttle for control of the speed of the plane, flaps of the plane for landing purposes, instrument carried by the plane such as radio receivers or transmitters, cameras. or to control devices adapted to release objects such as bombs, etc., from airplanes.

In pursuance of the invention, the control of parts of or objects carried by a moving vehicle is effected by radio signals and preferably by the transmission to the vehicle of a carrier wave of radio frequency, a suitable radio receiver being provided on the vehicle to receive the control signals and transmit them to suitable apparatus which accomplishes the desired control of the intended part or parts.

It is an object of the invention to effect the control of the desired part or parts through any desired extent or angle of adjustment by the transmission of pulses of energy of controlled duration and to provide, at the controlled device, suitable mechanism which effects the control in accordance with the duration of the pulses.

To provide energy pulses of any desired duration, it is a further object of the invention to provide at the transmitting station a novel means and method for controlling the action of one or more oscillators which effect the modulation of the transmitted carrier wave. In pursuance of this object, the control of the oscillators is preferably effected by a novel circuit arrangement which includes a relay and a relay control device.

Another object is to provide suitable mechanism for the control of a movable controlled part on the airplane or other vehicle by a control handle located at a ground station or in another vehicle, the controlled member moving in one direction or in an opposite direction in accordance with the movement of the control handle in one direction or in an opposite direction from a neutral position thereof. The mechanism also provides for the movement of the controlled member or part in accordance with the extent of adjustment or angle of rotation of the control handle.

A still further object is to provide for the control of two different control devices or members on an airplane or other vehicle by means of a single control handle located at a ground station or in another airplane or vehicle. The control handle is preferably mounted for universal movement similar to the control stick of an airplane, so that it may be rotated about either a lateral axis or a longitudinal axis or about both axes simultaneously.

Other and further objects of the invention will become apparent to those skilled in the art as the description thereof proceeds. For a better understanding of the invention, however, reference is made to the accompanying drawings, in which:

Figure 1:
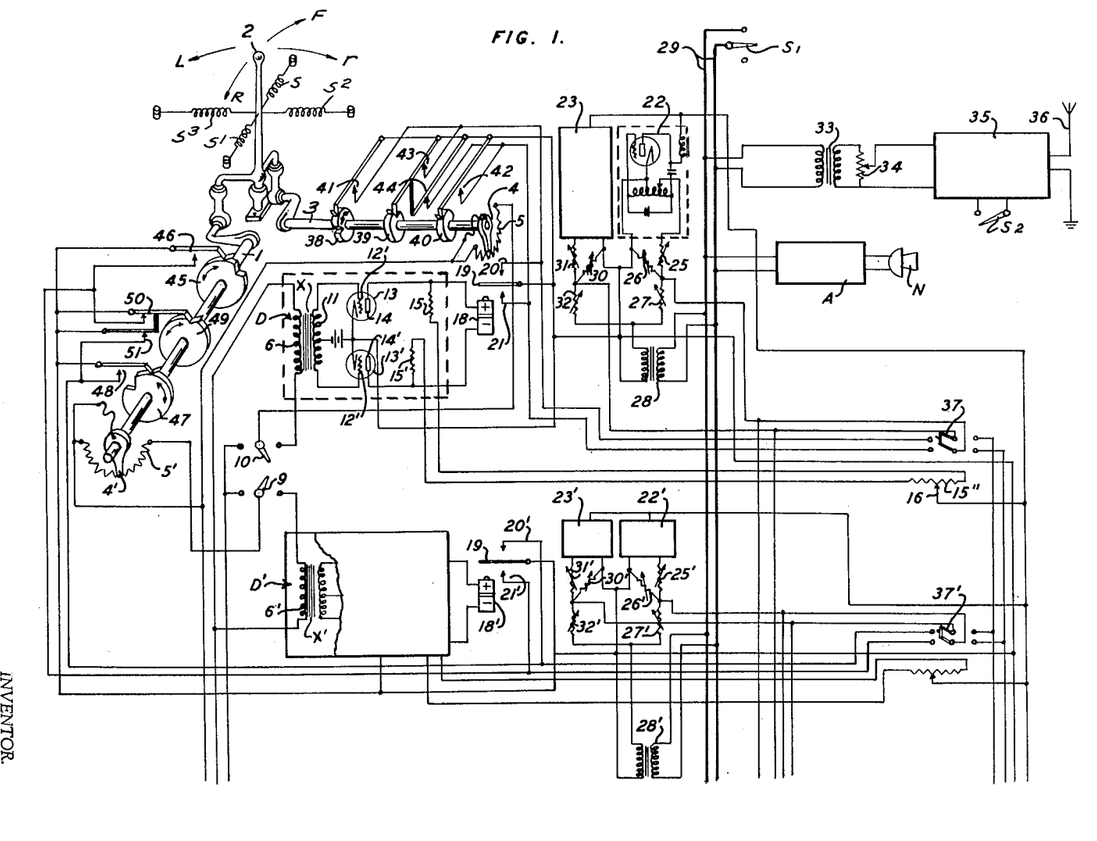
Fig. 1 is a schematic circuit diagram of a radio transmission system embodying the invention and also showing certain mechanical control features schematically.

Referring to Fig. 1, a rotatable control shaft 1 is shown as provided with a control lever or stick 2 mounted for universal movement, in the manner of the usual control stick of an airplane, so that its rotation in a plane normal to the longitudinal axis of shaft 1 causes rotation of this shaft while its rotation in a plane passing through the axis of shaft 1 causes rotation of a shaft 3 mounted to rotate about a lateral axis at right-angles to shaft 1. Rotation of lever 2 in intermediate planes obviously causes rotation of both the shafts 1 and 3 simultaneously. A rheostat arm 4 mounted on shaft 3 serves to control a variable resistor 5 adapted to be connected in series with the primary winding 6 of an iron core transformer X and a battery 7 (Fig. 3) through the leads shown and switches 8 (Fig. 3) and 10 (Fig. 1). Transformer X comprises one of the components of a differentiator designated generally by the reference letter D and which comprises the secondary winding 11 having its opposite ends connected to the control grids 12, 12' of the vacuum tubes 13, 13'. Transformer X is of the step-up type having an iron core and with a turn ratio between the secondary and primary windings of substantially 130 to 1 or higher. The plates 14, 14' of these tubes are connected to the ends of a circuit including the series connected resistors 15, 15', 15'', an intermediate point of resistor 15'' being connected through adjustable contact 16 and the lead shown to the positive terminal of a battery 17 (Fig. 3) whose negative terminal is grounded as shown. The plates 14, 14' are also connected to the terminals of a polarized relay 18 provided with an armature 19 which cooperates with the upper and lower contacts 20 and 21. Sliding contact 16 is adjusted so that normally no current passes through the winding of relay 18 and its armature 19 remains in the mid-position shown.

It will be understood that a differentiator similar to D operating a polarized relay similar to 18 is provided for each airplane part or other device to be controlled, the differentiators being designated by D', D'', D''', etc., and their component parts being designated by similar numerals primed, double primed, etc. Differentiator D' and its connected relay 18' are connected to resistor 5' over which the contact arm 4' carried by shaft 1 operates, the resistor 5' being connected to the primary winding 6' of the input transformer X', movement of the handle 2 to rotate the shaft 3 in one direction may tilt the elevators upward from their mid-position and its movement in the opposite direction causes them to tilt downwards. Movement of handle 2 to rotate shaft 3 in one direction will then serve to control the elevators to elevate the airplane, whereas its movement in the opposite direction controls them in a direction to depress the airplane. Movement of the handle 2 to rotate shaft 1 in one direction may lower the right aileron from its normal wing position and raise the left aileron, whereas its movement in the opposite direction causes the left aileron to be lowered from its normal wing position and the right aileron to be raised. Thus a movement of handle 2 in one direction to rotate shaft 1 will serve to bank the airplane on its left side, and movement of handle 2 in the opposite direction will serve to bank it on its right side.

For each of the relays of the system, a pair of sources of signaling tone are provided such as 22—23, 22'—23', etc., each source comprising an audio frequency oscillator, such as 24, whose output terminals are connected through the resistance network 25, 26, 27 and transformer 28 to the tone bus bars 29. The output terminals of tone generator 23 are shown connected to the primary of a transformer 28 through the resistance network 30, 31 and 32, the several resistors of the networks being adjustable, as indicated, in the preferred construction. The tone bus bars 29 are connected by any suitable means, such as the transformer 33 and variable resistor 34 to the modulator input terminals of a radio frequency transmitter 35 arranged to generate a carrier current of constant frequency. The output terminals of transmitter 35 are connected to an antenna 36. When the transmitting equipment is located at a ground station, one of the transmitter terminals may be connected to ground, as shown, and when the transmitting equipment is located on a movable vehicle, as for example, in another airplane, any suitable known type of transmitting antenna may be provided. The tone frequency generators 22—23, 22'—23', 22''—23'', etc., are preferably designed to generate currents of 1020, 1380, 1860, 2460, 3180, 4020, 4740 and 5340 cycles per second, respectively, although it will be understood that other suitable frequencies may be used. This particular series of frequencies has been selected to provide for adequate selection and segregation of the tone frequencies at the receiver. It also serves to prevent interference between harmonic frequencies and also that due to the sum and difference frequencies at the receiver.

In the operation of the transmitter, rotation of shaft 3 by the lever 2 changes the value of resistance 5 by an amount proportional to the throw of the lever, thereby changing the value of the direct current passing through primary winding 6 of transformer X. If lever 2 is rotated clockwise about shaft 3 from the neutral or mid-position shown, resistance 5 is increased, causing a pulse of current in secondary winding 11 in one direction, whereas if the lever is rotated counter-clockwise about shaft 3 from the neutral position, the pulse of current generated in secondary 11 will be in the opposite direction. A voltage is thus produced across secondary 11, the direction of which depends on the direction of movement of lever 2 and the duration of which depends on the extent of its movement. This voltage is caused, through the amplifier tubes 13—13', to operate polarized relay 18 so that its upper contact 20 is closed in response to a voltage in secondary 11 in one direction and its lower contact 21 closed in response to a voltage pulse in the opposite direction. The relay contacts are selectively maintained closed until lever 2 is brought to a position of rest, that is, during a desired time interval. Motion of lever 2 in a direction to cause armature 19 to close the lower contact 21 causes a short circuiting of resistor 26, the switch 37 being closed in its position to the left. This prevents the tone frequency of 1020 cycles generated by oscillator 22 from being impressed on the bus bars 29 and transmitter 35 while lever 2 is in motion, the tone frequency of 1380 cycles being transmitted during the motion of the lever. Upon lever 2 becoming stationary, the grids 12 and 12' are at the same potential and the plate circuits of tubes 13—13' are again balanced so that no current flows through the windings of relay 18 and armature 19 returns to its open position. Thereupon both the tone frequencies of 1020 and 1380 cycles are transmitted.

Similarly, motion of lever 2 in an opposite direction causes the plate circuits of tubes 13—13' to become unbalanced so as to cause current to flow through the winding of relay 18 in such direction as to close the upper relay contact 20, thereby short circuiting resistor 30. This prevents the tone frequency of 1380 cycles generated by oscillator 23 from being impressed on bus bars 29 and transmitter 35. It thus follows that the rotation of control lever 2 in one direction causes one of the oscillator tone frequencies to be omitted from the transmission by the carrier wave, the duration of this omission being proportional to the extent of throw of lever 2. Similarly, rotation of the lever in the opposite direction causes the other oscillator tone frequency to be omitted from the transmission. Since, as will be explained later, the response of the controlled function of the airplane depends on the length of time that a tone is eliminated, it follows that for optimum results, the operator should move lever 2 at equal velocities at all times so as to secure the closest possible agreement in phase relationship between the control lever at the ground station and that on the aircraft. However, during the normal running of an airplane, the control lever is continuously passed through its neutral or mid-position, at which point synchronization of the control lever on the airplane and that at the ground station is reestablished in the event that there is not a close agreement in phase relationship.

For the purpose of establishing this synchronization, shaft 3 is provided with the cams 38, 39 and 40, cam 38 serving to open and close a switch 41, cam 40 to open and close a switch 42 and cam 39 to open and close both of the switches 43 and 44. When lever 2 is brought to the neutral position shown in Fig. 1, switches 43 and 44 are both closed. Since the upper switch 43 is connected in parallel with upper relay contact 20 and armature 19 and the lower switch 44 is connected in parallel with lower relay contact 21 and armature 19, both the tone frequencies generated by the generators 22 and 23 will be omitted from the transmission, which causes the controlled shaft on the airplane to be moved into its neutral position, by means to be described later.

While the lever 2 is being moved forward in the direction F the upper relay contact 20 closes, eliminating the tone frequency of generator 23 from the transmission and causing the controlled member on the airplane to move in the same direction. When lever 2 is stopped at its extreme forward position, the armature 19 is returned to its neutral position, but cam 38 has closed the switch 41 which provides a short circuit across upper contact 20 and armature 19, thereby continuing the omission of the frequency of generator 23 from the transmission. This omission causes the controlled member to continue its motion in the same direction until it reaches its extreme forward position when it is again in place with control lever 2. In a similar manner, movement of lever 2 rearwardly from its neutral position as indicated by R, causes the closure of lower relay contact 21 and the omission of the tone frequency of generator 22 from the transmission. When lever 2 is stopped at its extreme rearward position, the lower relay contact 21 is opened but cam 40 has closed the switch 42 which provides a short circuit across lower contact 21 and armature 19, thus continuing the omission of the tone frequency of generator 22 which causes the controlled member on the airplane to move rearwardly until it reaches its extreme rearward position, when it is again in phase with control lever 2. Means is thus provided for causing the tone frequencies of both generators 22 and 23 to be suppressed when lever 2 is in its neutral position; when it is moved forward, the frequency of generator 23 is omitted. This frequency continues to be omitted when the lever reaches its extreme forward position as long as it remains in that position. When the lever is moved rearward from its neutral position the frequency of generator 22 is omitted and continues to be omitted after the lever has reached its extreme rearward position and as long as it remains there.

Movement of lever 2 about the longitudinal axis causes shaft 1 to rotate and contact arm 4' to operate the differentiator D' by changing the current through resistor 5'. Movement of lever 2 to the left, as indicated by L, causes the closing of the lower contact 21' of relay 18' thereby eliminating the tone of generator 22' from transmission and causing the controlled member to move to the left. When lever 2 reaches its extreme leftward position, cam 45 causes the closure of switch 46 which short circuits the resistor 26' and thus continues the suppression of the tone of generator 22' and movement of the controlled member into its extreme leftward position in phase with lever 2. Similarly, movement of lever 2 to the right as indicated by r, causes the closing of upper contact 20' of relay 18' and the consequent elimination of the tone frequency of generator 23' from the transmission and the movement of the controlled member to the right. When lever 2 is moved into its extreme position to the right, cam 47 causes the closure of switch 48 which short circuits the resistor 30' and thus continues the elimination of the tone frequency of generator 23' and causes the movement of the controlled member into its extreme rightward position when it is again in phase with lever 2. For the purpose of eliminating the tone frequencies of both generators 22' and 23' when lever 2 is in its neutral position, and thus bringing the controlled member into its neutral or mid-position, shaft 1 is provided with a cam 49 which causes the closure of the upper and lower switches 50—51 which are connected with the lower and upper contacts 21' and 20' respectively. For the purpose of automatically returning the control lever 2 to its mid or neutral position upon its release by the operator, suitable springs s, s1, s2, and s3 are provided, the outer ends of which are fixed and their inner ends connected to the lever, as shown.

For the purpose of readily eliminating all the tones from the transmission, a bus bar switch S1 is provided, the closure of which serves to short circuit the bus bars 29. The closure of this switch, by the elimination of all the tone frequencies, serves to cause all the controlled members on the airplane to be automatically returned to their mid or neutral positions in a manner to be later described. For the purpose of eliminating the carrier from the transmission in order to release a relay which in turn controls all the torque amplifier motors to be later described, the transmitter 35 is provided with a switch S2, the closure of which stops the transmission of the carrier wave. Where speech communication with an operator on the controlled airplane or other vehicle is desired, a microphone N and audio frequency amplifier A may be provided, the output terminals of the amplifier being connected to the tone bus bars 29, as shown in Fig. 1.

Figure 2:
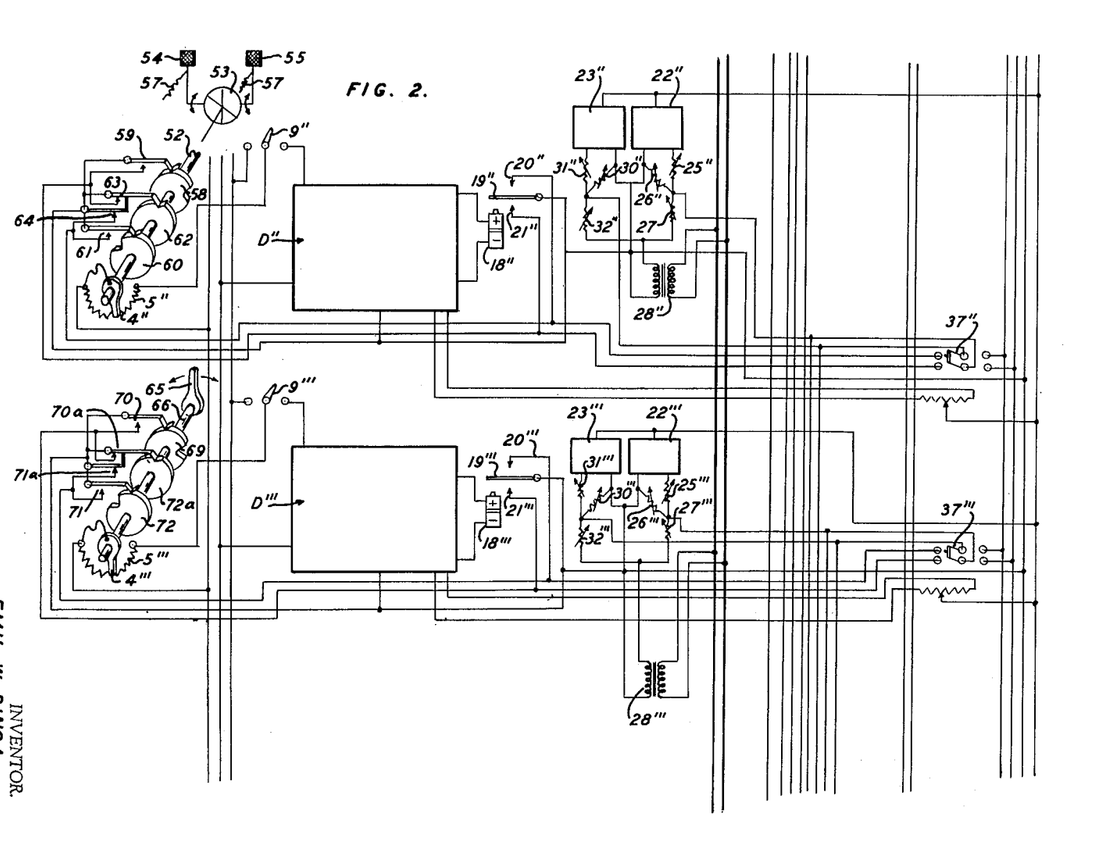
Fig. 2 is a schematic diagram showing an extension of the transmitting system of Fig. 1 to provide for the remote control of the rudder and throttle of the airplane.

Fig. 2 is a continuation of Fig. 1 and shows diagrammatically a portion of the means for controlling the rudder and throttle of the controlled airplane. The control shaft 52 is provided with a differential 53 to which the left and right rudder control pedals 54, 55 are connected, suitable springs 57 connected to pedals 54, 55 urging the pedals to a neutral position. As in the case of the shaft 1 of Fig. 1, depression of pedal 54 to rotate shaft 52 counter-clockwise causes differentiator D'' and relay 18'' to close the lower contact 21'' of the relay which in turn serves to short circuit the resistor 26'' and eliminate the tone of generator 22'' from the transmission. To continue the elimination of this tone when shaft 52 has reached its extreme counter-clockwise position, the cam 58 and switch 59 are provided, the closure of switch 59 short circuiting armature 19'' and lower relay contact 21''. Depression of the right pedal 55 to rotate shaft 52 clockwise, causes differentiator D'' and relay 18'' to close the upper relay contact 20'' which in turn serves to short circuit the resistor 30'' and eliminate the tone of generator 23''. The cam 60 closes the switch 61 which short circuits armature 19'' and upper relay contact 20'' and serves to continue the elimination of the tone of generator 23'' while shaft 52 is maintained in its extreme clockwise position. Also, as in the case of Fig. 1, shaft 52 is provided with a cam 62 which serves to close both the switches 63 and 64 which are shunted across the lower and upper relay contacts 21'' and 20'', respectively, to eliminate the tone frequencies of both generators 22''', 23'' as long as the rudder control shaft 52 remains in its neutral position as shown.

Fig. 2 also shows schematically a throttle adjusting device in the form of an arm or lever 65 connected to a throttle control shaft 66. Adjustment of the arm 65 to rotate shaft 66 counter-clockwise to close the throttle causes differentiator D''' to operate relay 18''' and close the lower relay contact 21''', thereby short circuiting the resistor 26''' and eliminating the tone of generator 22''' from the transmission. Cam 69 and switch 70 serve to continue the elimination of the tone of generator 22''' while the shaft 66 remains in its extreme throttle closing position, the switch 70 serving to short circuit armature 19''' and contact 21'''. Adjustment of arm 65 in the opposite direction to open the throttle, causes the closing of the upper relay contact 20''' and armature 19''' which then short circuit resistor 30''' and cause the elimination of the tone of generator 23''' from the transmission. With shaft 66 adjusted to full throttle opening position, the suppression of the tone of generator 23''' is continued by the closure of switch 71 by the cam 72, switch 71 then short circuiting armature 19''' and contact 20'''. For the purpose of bringing the throttle into its mid-position when the control arm 65 is adjusted into its mid-position, the shaft 66 is provided with a cam 72a which closes the switch contacts 70a and 71a upon the arm 65 being adjusted into its mid-position. Since the closure of switches 70a and 71a serves to short circuit the armature 19''' and its upper and lower contacts 20''' and 21''', the tone frequencies of both the generators 22''' and 23''' are eliminated from the transmission.

Figure 3:
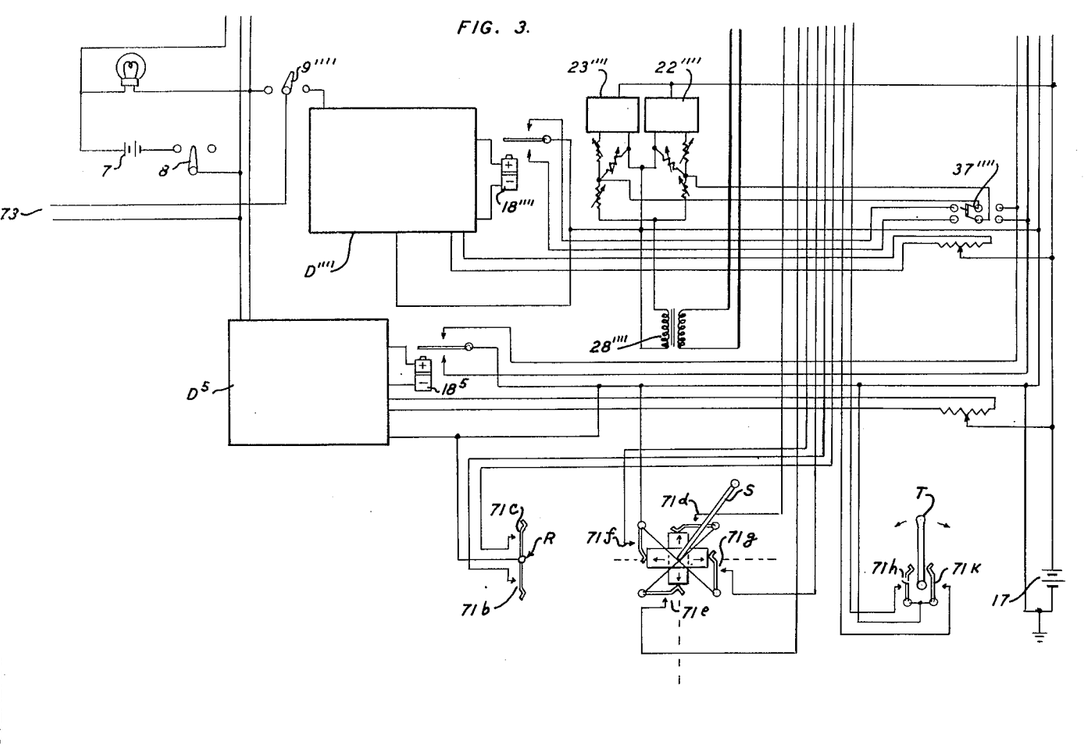
Fig. 3 is a schematic circuit diagram showing a further extension of the transmitting system of Fig. 1 to provide for emergency or spare apparatus adapted to be connected in the transmission system instead of certain apparatus shown schematically in Figs. 1 and 2 and for supplementary miniature controls.

Fig. 3 shows a differentiator D'''' which may be employed to control special devices on the controlled airplane such as a smoke release device or a device for releasing a bomb. This differentiator and its associated tone generators operate in the same manner as the others above described. The control circuit for D'''' is intended to be connected across the terminals 73, the switch 9'''' being thrown to the right when this differentiator is in use.

Fig. 3 also shows a spare differentiator $D^5$ which is for reserve use and may readily be substituted for any one of those previously described if for any reason a differentiator becomes disabled. Should the differentiator D' of Fig. 1, for example, become disabled, by throwing its switch 9 to the left and the switch 37' to the right, it will be disconnected from the tone generators 22'—23' and control of these generators will be taken over by differentiator $D^5$ and its associated relay $18^5$. Rotation of lever 2 and shaft 1 about the longitudinal axis will then act to control the elimination of the tone frequencies of generators 22'—23' through the differentiator $D^5$ and its associated relay $18^5$.

Fig. 3 also shows auxiliary control means provided for emergency use in the control of the throttle, ailerons, elevators and rudder of the controlled plane. The auxiliary rudder control means R consists of a pair of switches 71b and 71c which represent the left rudder 54 and right rudder 55 respectively. Closure of switch 71b serves to short circuit the resistor 26'' and thereby eliminate the tone frequency of generator 22'' from the transmission, while closure of switch 71c short circuits the resistor 30'' thus eliminating the tone frequency of generator 23'' from the transmission. It will be understood that the switches 37, 37' (Fig. 1) and 37'', 37''' (Fig. 2) are open when the auxiliary controls are used.

The auxiliary aileron and elevator control comprises a miniature control stick S which is arranged to selectively actuate and close the switch contacts 71d, 71e, 71f and 71g. Movement of stick S to close the switch 71d serves to short circuit the resistor 26 (Fig. 1) and eliminate the tone frequency of generator 22 from the transmission, thereby operating the up elevator, while movement of the stick to close switch 71e serves to short circuit the resistor 30, Fig. 1, and eliminate the tone frequency of generator 23 from the transmission, thereby operating the down elevator. Movement of stick S to close switch 71f serves to short circuit the resistor 26', Fig. 1, and thus eliminate the tone frequency of generator 22' from the transmission to operate the left aileron. Movement of the stick to close the switch 71g serves to short circuit the resistor 30', Fig. 1, and eliminate the tone frequency of generator 23' from the transmission and operate the right aileron.

The auxiliary throttle control comprises a throttle control lever T which may be moved to the right or left from the position shown in Fig. 3 to open or close the throttle. Movement of lever T to the left serves to close the switch 71h which short circuits the resistor 30''', Fig. 2, causing the elimination of the generator 23''' from the transmission and the opening of the throttle. Movement of lever T to the right serves to close the switch 71k, which short circuits the resistor 26''', Fig. 2, thereby causing the elimination of the tone of generator 22''' from the transmission and the closing of the throttle. It will be noted that the switches actuated by the auxiliary controls R, S and T eliminate the tone frequencies of the desired generators by direct connections between the several switches and the output terminals of the generators and not through the differentials D, D', etc., and their controlled differential relays 18, 18', etc. While the miniature or auxiliary controls described are not provided with automatic means for obtaining synchronization of the corresponding controlled parts, yet by holding either of the auxiliary controls in its extreme position a suitable length of time, the corresponding controlled member will be adjusted into its extreme position and be brought into phase with the control member, in case the two have been out of phase or synchronization.

Figure 4:
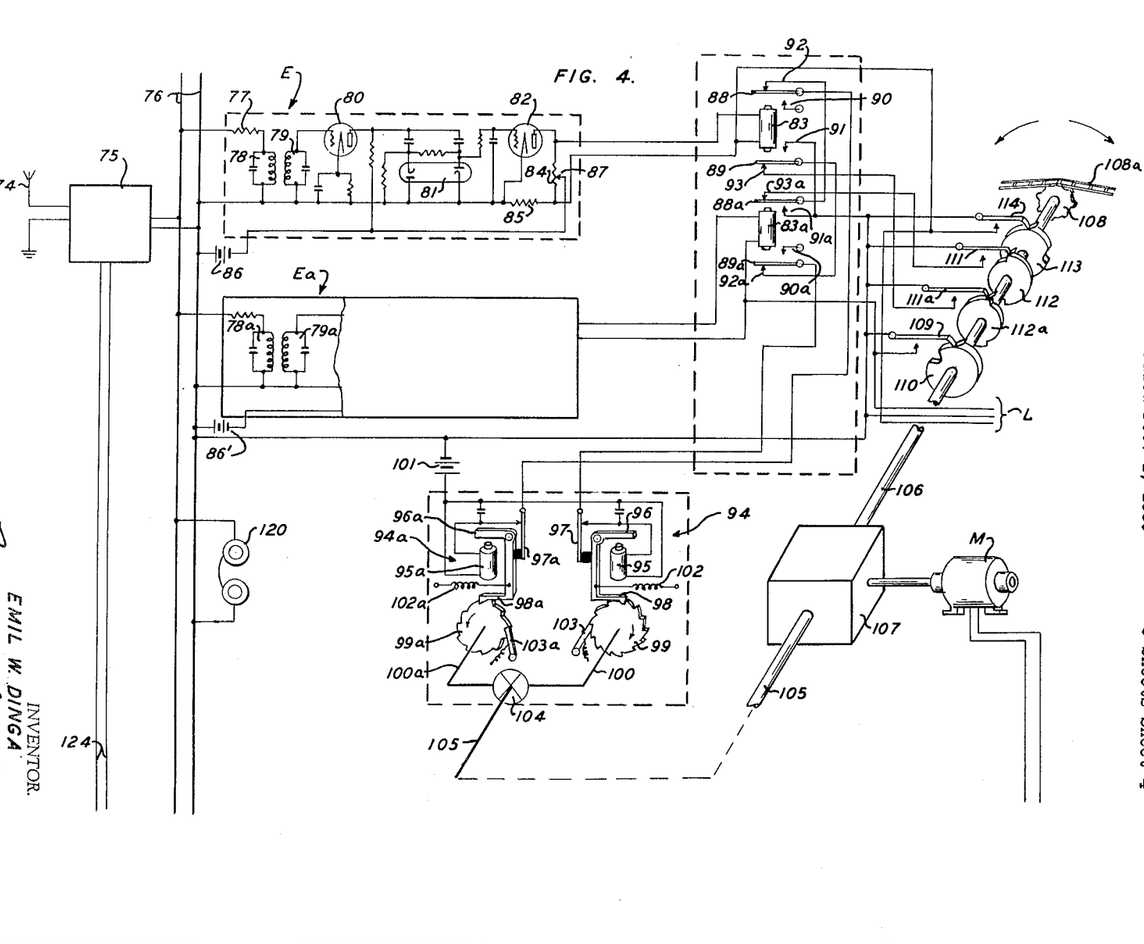
Fig. 4 is a schematic circuit diagram of a radio receiving system embodying the invention also showing certain features of the controlled apparatus schematically.

Referring now to Fig. 4 which shows schematically the apparatus mounted on the controlled airplane for controlling its ailerons, a receiving antenna 74 is connected to the input terminals of a tunable radio recevier 75 which is provided with known means for receiving the carrier wave of transmitter 35 and detecting and amplifying its modulating tone frequencies. The output of receiver 75 is applied to the tone bus bars 76, to which a plurality of tunable amplifying channels E, Ea, E', E'a, etc., responsive to the tone frequencies of generators 22, 23, 22' 23', etc., respectively, are connected. Each of these channels is similar in construction and comprises a frequency selective network comprising an isolating resistor 77 and two parallel resonant circuits 78, 79, both tuned to the audio frequency to which the particular channel is responsive. The selected current is amplified in the amplifier tube 80 and rectified in the rectifier tube 81. The rectified output of tube 81 is amplified in the direct current amplifier tube 82. The plate circuit of amplifier tube 82 actuates a relay 83 and comprises the resistors 84, 85 and a plate battery 86. One terminal of battery 86 is connected to an adjustable contact 87 which is preferably so adjusted that no direct current flows through the winding of relay 83 when the tone frequency to which channel E is responsive is not being received. The channel Ea is similar in all respects to channel E except that its input circuits 78a, 79a are resonant to the frequency of generator 23, its output circuit being connected to relay 83a. Relay 83 is provided with a pair of armatures 88, 89 adapted to selectively engage the inner contacts 90, 91 and the outer contacts 92, 93. The corresponding contacts of relay 83a are designated 90a, 91a, 92a, 93a and its armatures 88a, 89a.

For each of the relays 83, 83a a self-vibrating motor 94, 94a is provided, these motors being similar, and motor 94 comprising a coil 95 and a movable armature 96 provided with a movable contact 97 and a pawl 98 which cooperates with the teeth of a ratchet wheel 99 mounted on a shaft 100. The movable contact 97 of motor armature 96 is connected, as shown, to armature 89a and current is supplied to coil 95 by a battery 101. A spring 102 having one end connected to a stationary point and its other end to armature 96 serves to move pawl 98 to the right after the motor circuit is broken by movable contact 97.

When the relays 83, 83a are both energized due to the transmission of the tone frequencies of both the channels E and Ea, the energizing circuits of motors 94 and 94a are open at contacts 92, 92a so that both motors are at rest. When, however, one of the relays, as, for example, relay 83 becomes de-energized, due to the cessation of transmission of the tone of channel E, its upper contact 92 is closed, thereby completing the circuit of motor 94a and causing its armature 96a to rotate counter-clockwise and move pawl 98a a sufficient distance to engage pawl 98a behind the next ratchet tooth. The motor circuit is simultaneously broken by movable contact 97a whereupon spring 102a causes pawl 98a to advance the ratchet 99a one tooth in a counterclockwise direction. This motion of armature 96a causes contact 97a to again close the motor circuit through coil 95a and the motor thus continues to vibrate and advance the ratchet wheel 99a during the time the tone of oscillator 22 is not being received. Suitable holding pawls 103, 103a cooperate with the ratchets 99, 99a to prevent their reverse rotation. Rotation of ratchet wheel 99a is communicated by shaft 100a to the input of a differential gearing device 104 having the output or driven shaft 105. Shaft 105 controls the rotation of a driven shaft 106 through a torque converter or amplifier 107 which may be operated by suitable power means such as an electric motor M. A driven sprocket wheel 108 is secured to shaft 106 and is in turn connected to the elevator (not shown) by a sprocket chain 108a. The other input shaft 100 of differential 104 is controlled in a similar manner by relay 83a. The torque converter 107 performs the function of increasing or amplifying the torque supplied by its input shaft 105 and causing its output shaft 106 to rotate in the same direction and through substantially the same angle as its input shaft 105. A suitable torque converter for this purpose is shown and described in the application of William A. Black, Ser. No. 284,644, filed July 15, 1939. This arrangement causes the desired adjustment of the airplane elevators and shaft 106, although the torque applied to shaft 105 by the impulse motors is of small value.

The arrangement described causes shaft 106 and the elevators to remain stationary when the tone frequencies of both oscillators 22 and 23 are being transmitted to the receiver 75 and this shaft to rotate in one direction or the other, depending upon which of the tones is omitted, and its rotation will continue for a period of time equal to the duration of the omission. In the example illustrated, motion of lever 2 (Fig. 1) clockwise or forward in the direction of F (Fig. 1) causes the elimination of the tone frequency of generator 23, to which channel Ea is responsive, and the operation of motor 94 and rotation of elevator control shaft 106 to the right or clockwise. When the movement of the lever 2 in the forward direction terminates, the tone frequency of generator 22 continues to be received but the tone frequency of generator 23 is also received and this causes the actuation of relay 83a and the interruption of the circuit of motor 94 at contact 92a, so that both motors are at rest and shaft 106, sprocket wheel 108 and the elevators remain locked in their adjusted position.

Movement of lever 2 further forward to its extreme position in the direction F again causes the elimination of the tone frequency of generator 23 and operation of motor 94 and consequent rotation of shaft 106 to its extreme right position. At this time the tone of generator 22 continues to be received, but the extreme movement of sprocket wheel 108 to the right causes the closure of contact 109 by a cam 110. This causes the passage of a current from a battery 86' to energize the winding of relay 83a, thereby breaking the circuit of motor 94 at contact 92a, which stops the motor. In this manner, exact correspondence in phase position of control lever 2 and elevator sprocket wheel 108 is assured in the extreme clockwise position, and the elevators are held in their extreme position.

Upon returning control lever 2 toward its neutral position, shown in Fig. 1, the tone of generator 22 is omitted from the transmission, the channel Ea causing the energization of relay 83a and operation of motor 94a and rotation of sprocket wheel 108 to the left toward its neutral position. This rotation continues until the control lever 2 reaches its neutral position when the tone frequencies of both generators 22 and 23 are omitted from the transmission in a manner above explained. This causes both the relays 83 and 83a to become de-energized, as shown in Fig. 4, so that the circuits of both the motors 94 and 94a are interrupted and both the motors brought to a stop.

If sprocket wheel 108 should not be in phase with control lever 2, as, for example, if it is lagging behind lever 2 when the latter reaches neutral position, both the relays 83 and 83a are de-energized. The circuit including motor coil 95a, battery 101, contact 92, contact 93a and movable contact 111 which cooperates with a cam 112 is closed, causing operation of the motor 94a and continued rotation of sprocket wheel 108 until it reaches neutral position when the motor circuit is broken at contact 111 and operation of the motor 94a ceases. A similar cam 112a and movable contact 111a serve in a similar manner to secure operation of motor 94 and adjustment of sprocket wheel 108 into its neutral position from the opposite direction. Proper in-phase relationship between the elevator control sprocket wheel 108 and the manual control lever 2 in their neutral positions also is thus assured.

A similar operation takes place in adjusting the sprocket wheel 108 and the elevators from their neutral to their extreme left positions. Movement of lever 2 counter-clockwise or rearwardly in the direction of R (Fig. 1) causes the elimination of the tone frequency of generator 22 to which channel E is responsive with the consequent operation of relay 83a and motor 94a in a manner similar to that above described in connection with channel Ea and motor 94. When sprocket wheel 108 reaches its extreme left position and is in phase with control lever 2, which is now in its extreme rearward position, a cam 113 causes closure of contact 114, which in turn causes the passage of current from battery 86 through the winding of relay 83 and the interruption at contact 92 of the circuit including battery 101 and the coil 95a of motor 94a. The motor 94a being interrupted, no further movement of sprocket wheel 108 to the left takes place, but it remains in phase with control lever 2, both in their extreme counter-clockwise positions, with the elevators in their extreme position. To provide for automatic control of the lateral stability, the three leads L, Fig. 4, are provided for the connection of a gyroscope control (not shown).

Figure 5:
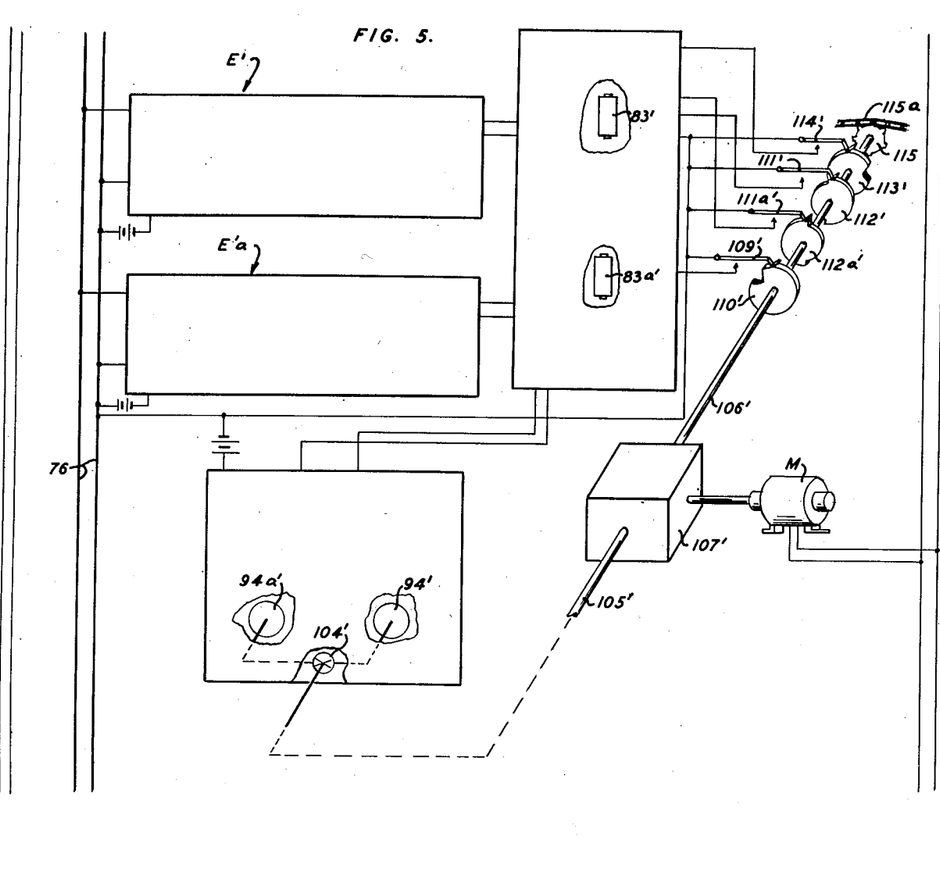
Fig. 5 is a schematic diagram showing an extension of the receiving system of Fig. 4.

Fig. 5 shows diagrammatically the means for controlling one or more ailerons on the airplane and comprises the channels E' and E'a, which are constructed similarly to channels E and Ea above described, except that the resonant circuits of channel E' are designed to pass the tone frequency of generator 22' while those of channel E'a pass the tone frequency of generator 23'. Through the relays 83' and 83a', which are similar to relays 83 and 83a, motors 94' and 94a', which are similar to motors 94 and 94a, a differential 104', torque converter 107' and shaft 106' an aileron sprocket wheel 115 is operated, this wheel being connected to the ailerons (not shown) by a sprocket chain 115a. Shaft 106' has mounted thereon the cams 110', 112', 112a' and 113' which cooperate with the movable switch contacts 109', 111', 111a' and 114', respectively, in the same manner as the cams 110, 112, 112a and 113 cooperate with their respective switch contacts, as above described.

With the lever 2 in its neutral position, as shown in Fig. 1, neither of the tone frequencies of generators 22' or 23' is transmitted, the relays 83' and 83a' are unenergized, motors 94' and 94a' are not operated and aileron sprocket wheel 115 remains locked in position. Upon movement of lever 2 to the left in the direction of arrow L, the tone frequency of generator 23' only is transmitted which causes the energization of relay 83a', which in turn causes the operation of motor 94a' and rotation of shaft 105' and 106' to the left, so that the aileron sprocket wheel 115 follows lever 2. Should lever 2 be adjusted into its extreme leftward position, the tone of generator 23' continues to be transmitted in the manner above described in connection with the operation of generator 23 and lever 2. Rotation of shaft 106' to the left, therefore, continues, if sprocket wheel 115 should not be in phase with lever 2, until these two members are again in phase, whereupon cam 113' causes the closure of movable contact 114' and the stoppage of motor 94a' in the manner above explained in connection with motor 94a and movable contact 114. Shaft 106' and sprocket wheel 115 then remain locked in their extreme leftward position until the control lever 2 is again moved to the right.

Upon movement of lever 2 to the right in the direction of arrow r from its extreme left-hand position, the tone frequency of generator 22' only is transmitted, which causes the energization of relay 83' which in turn causes the operation of motor 94' and rotation of shaft 106' to the right so that the sprocket wheel 115 follows the motion of lever 2. If lever 2 is adjusted to its neutral position, the tone frequencies of both generators 22' and 23' are omitted from the transmission so that both of the relays 83' and 83a' are unenergized. If at this time the sprocket wheel 115 has not yet reached its neutral position, a circuit is established by the operation of cam 112a' and movable contact 111a', which closes the circuit through the coil of motor 94'. The continued operation of motor 94' rotates the sprocket wheel 115 to its neutral position, when the motor circuit is broken at the contact 111a' and operation of motor 94' ceases, locking the sprocket wheel 115 in its neutral position in phase with control lever 2.

If lever 2 is moved to the right beyond its neutral position, the tone of generator 23' continues to be suppressed, the tone frequency of generator 22' only being transmitted. This causes the energization of relay 83' and the operation of motor 94', causing the rotation of shaft 106' and sprocket wheel 115 to the right or clockwise. If control lever 2 is stopped at an intermediate position, the tone frequency of generator 23' is restored to the transmission so that both the relays 83' and 83a' are energized and the circuit of motor 94' broken in a manner above explained in connection with the relays 83, 83a and motor 94. Upon moving lever 2 further toward its extreme clockwise position, the operation of motor 94' is resumed, and if at the time lever 2 reaches its extreme clockwise position in the direction indicated by r (Fig. 1) the sprocket wheel 115 has not yet reached its extreme position to the right (Fig. 5), the transmission of the tone frequency of generator 22' continues, causing continued operation of motor 94'. Upon the sprocket wheel 115 reaching its extreme right-hand position in phase with control lever 2, the cam 110' causes the closure of contact 109' and the stoppage of motor 94' in the manner above explained in connection with motor 94, cam 110 and contact 109 (Fig. 4). It is thus seen that means is disclosed to provide in-phase relationship between the aileron sprocket wheel and the operator's control lever in their neutral positions and also in both their extreme operating positions.

The means provided for operating the rudder of the airplane is shown diagrammatically in Fig. 6, the components corresponding in construction and operation to those above described in connection with Fig. 5, corresponding parts being indicated by the same reference characters double primed, the rudder control sprocket wheel being indicated at 116 and being connected to the rudder (not shown) by means of the chain 116a. Channel E'' is responsive to the tone frequency of generator 22'' (Fig. 2) and channel Ea'' is responsive to the tone frequency of generator 23''. Depression of the left pedal 54 (Fig. 2) to move the rudder and sprocket wheel 116 to the left, causes the tone frequency of generator 23'' only to be transmitted, which causes the operation of relay 83a'' and motor 94a'' which rotates shaft 106'' and sprocket wheel 116 toward the left.

Depression of the right pedal 55 causes the transmission of the tone frequency of generator 22'' only, which causes the energization of relay 83'' and operation of motor 94'' which rotates the sprocket wheel 116 toward the right through the differential 104'' and torque converter 107''. The cams 110'', 112'', 112a'', 113'' and their cooperating contacts shown in Fig. 6 operate to secure in-phase relationship between the rudder sprocket wheel 116 and the control shaft 52 (Fig. 2) at the neutral and both extreme positions of shaft 52 in the same manner as above explained in connection with the corresponding cams and their associated contacts of Fig. 4. The invention thus provides for controlling the rudder of the airplane by means of the conventional two pedals and associated apparatus which is located at the ground station.

Figure 6:
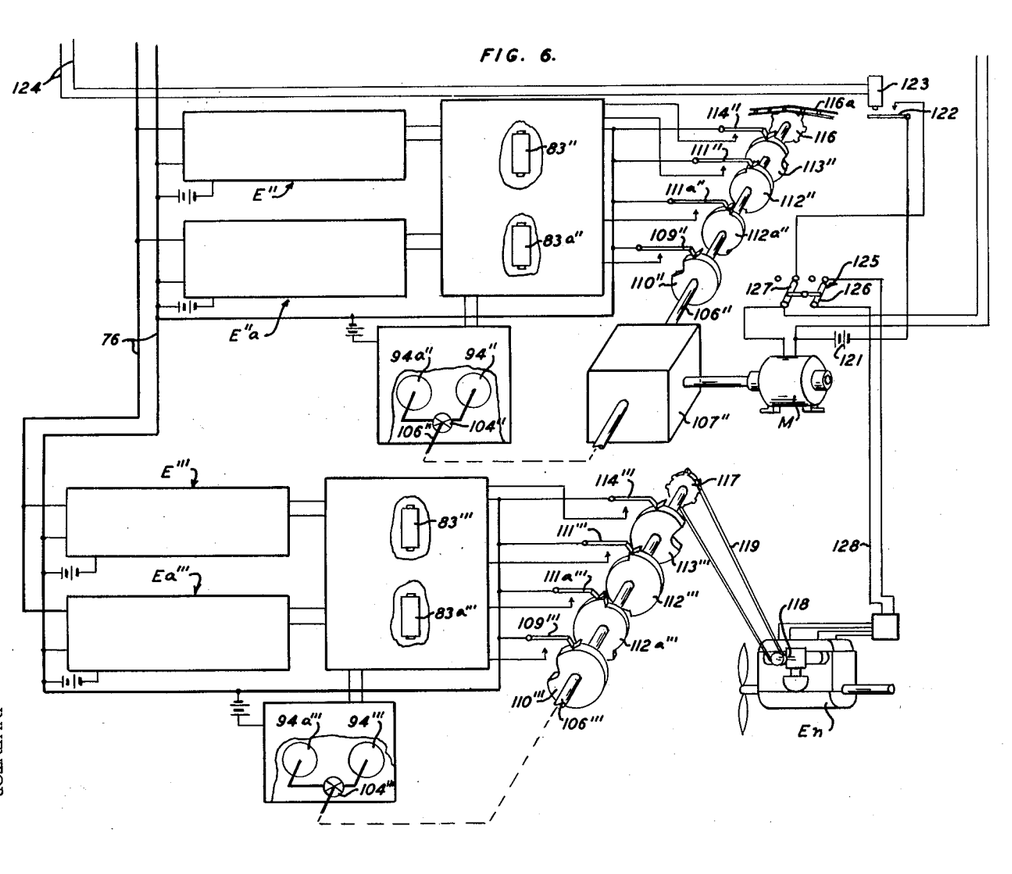
Fig. 6 is a schematic diagram showing a further extension of the receiving system of Fig. 4 and showing schematically an embodiment of the invention for controlling the rudder and throttle of an airplane.

Fig. 6 also shows diagrammatically the means for operating the throttle on the controlled airplane to control its speed. The several components correspond in construction and operation to those above described in connection with Fig. 5, corresponding parts being indicated by the same reference characters triple primed, the throttle control being indicated by a sprocket wheel 117 which may be connected to the throttle valve shaft 118 by any means as, for example, the chain 119. In this case the channels E''' and Ea''' are responsive to the tone frequencies of generators 22''' and 23''', respectively (Fig. 2), the transmission of the tone of generator 22''' only causing rotation of sprocket wheel 117 to the right to open the throttle. The transmission of the tone of generator 23''' only, causes rotation of sprocket wheel 117 to the left with the consequent closing of the throttle. The cams 110''' and 113''' and their cooperating contacts 109''' and 114''' serve to secure in-phase relationship between the sprocket wheel 117 and the throttle control lever 65 (Fig. 2) in fully open and fully closed throttle positions, respectively, in the manner previously described in connection with the corresponding parts of Fig. 4, while the cams 112''', 112a''' and their cooperating contacts 111'''' and 111a''', respectively, provide in-phase relationship between the sprocket wheel 117 and control lever 65 at the cruising position of said lever and the cruising position of the throttle in the same manner as previously described in connection with the corresponding parts of Fig. 4.

The torque amplifier motors M are shown in Figs. 4, 5 and 6 as being energized through a circuit including a storage battery 121 and the movable switch contact 122 of a relay 123, the winding of relay 123 being connected to the receiver 75 by the leads 124 and dual switch 125. This arrangement provides a ready means for permitting the stopping and starting of the torque amplifier motors by the operator at the ground station. With the switch S2, Fig. 1, open, the carrier frequency is transmitted thereby causing the energization of the winding of relay 123, Fig. 6, and the starting of the torque amplifier motors M which will continue to operate until the switch S2 is closed. The closing of this switch suppresses the carrier frequency, causing the release of relay 123 and the opening of the motor circuits by the relay switch 122 and thereby stopping the motors.

From the foregoing it will be readily understood that upon the closure of switch S1, Fig. 1, by the operator and the consequent elimination of the tone frequencies of all the generators 22, 23, 22', etc., from the transmission, each of the controlled shafts 106, 106', 106'' and 106''' (Figs. 4 to 6) will be automatically returned to its mid or neutral position by means of the cams 112, 112a, 112', 112a', etc., in the manner previously described.

In the embodiment illustrated, a manually operable switch 125 is shown as having two switch blades 126 and 127, the switch blade 126 serving to close the main ignition circuit 128 of the aeroplane engine En and the switch blade 127 serving to close the circuit of the torque amplifier motors M, in the closed switch position illustrated in Fig. 6. Assuming that relay 123 is being energized due to the transmission of a carrier current, the pilot of the controlled plane may readily interrupt the main ignition circuit 128 of the engine and simultaneously break the circuit supplying current to the motors M by throwing switch 125 to the left from its position shown in Fig. 6. It is thus seen that the switch 125 provides a ready means under the control of the pilot for stopping the engine of the plane and also for stopping the motors which operate the torque converters.

As shown in Fig. 4, a pair of telephone receivers 120 may be connected to the bus bars 76 for use by the safety pilot, should one be on the plane, to listen to any tone frequencies which may be transmitted and to any verbal instructions which may be transmitted from microphone N and amplifier A at the ground station (Fig. 1) or other control point.

I have described what I believe to be the best embodiments of my invention. I do not wish, however, to be confined to the embodiments shown, but what I desire to cover by Letters Patent is set forth in the appended claims.

I claim:

1. In a device of the class described, the combination of a radio transmitter, a first source of audio frequency oscillations, a second source of audio frequency oscillations having a frequency different than the frequency of the first source, circuits connecting said sources to the modulating input of the transmitter, a control shaft, a pair of switch contacts positioned adjacent said shaft, a circuit connecting said contacts to the terminals of said first source of oscillations, means mounted on said shaft to maintain said contacts open during a substantial angular rotation of said shaft and to close said contacts upon rotation of said shaft to an extreme limit position thereof in one direction, a second pair of switch contacts positioned adjacent said shaft, a circuit connecting said last named contacts to the terminals of said second source of oscillations, means mounted on said shaft to maintain said second pair of switch contacts open during a substantial angular rotation of said shaft and to close them upon rotation of said shaft to an extreme limit position in the opposite direction and a manual control member connected to selectively rotate said shaft in either direction from a neutral position thereof into either of said extreme limit positions.

2. The combination as set forth in claim 1 in which the circuits connecting the two pairs of switch contacts to the terminals of the sources of oscillations are provided with additional switch contacts positioned adjacent the shaft, and means operated by said shaft for closing said additional contacts at a position of said shaft substantially midway between its extreme limit positions.

3. In a device of the class described, the combination of a radio transmitter, a source of audio frequency oscillations, a circuit continuously connecting said source to the modulating input of the transmitter, a control shaft, a pair of switch contacts positioned adjacent said shaft, a circuit connecting said contacts to the terminals of the source of oscillations, cam means connected to said shaft and arranged to maintain said contacts open during a substantial angular rotation of said shaft and to permit closure of said contacts upon rotation of said shaft to a predetermined limit position thereof in one direction.

4. A device adapted for controlling a transmitter comprising, in combination, a pair of electron discharge tubes each having a cathode, grid and plate, a circuit arranged to supply substantially the same potential to the plates of the tubes, an input transformer having primary and secondary windings, the ends of the secondary winding being connected to the tube grids, a circuit connected to the ends of the primary winding and including a source of potential and a resistor connected in series with said primary winding, and a manual control member for varying the resistance of the resistor.

5. A device comprising the combination as set forth in claim 4 in which the manual control member comprises a contact adjustable along the resistor, a shaft secured to said contact and a lever connected to said shaft.

6. In a radio control system, the combination of a radio transmitter, a first source of audio frequency oscillations, a second source of audio frequency oscillations, a third source of audio frequency oscillations, a fourth source of audio frequency oscillations, the frequencies of the oscillations generated by said four sources being different from each other, a manual control member arranged for oscillation in two different planes, means including a shaft connected to said control member for causing the modulation of the carrier wave of the transmitter by the oscillations of the first or second sources selectively in response to movement of the control member in one of said planes, and means including a second shaft connected to said control member for causing the modulation of the carrier wave of the transmitter by the oscillations of the third or fourth sources selectively in response to movement of the control member in the other of said planes.

7. The combination as set forth in claim 6, in which the manual control member is mounted for oscillation about the axis of either of said shafts which are substantially normal to each other.

8. The combination as set forth in claim 6, in which means are provided to prevent the modulation of the carrier wave by all of said oscillation sources, in response to the positioning of the manual control member in the line of intersection of said planes.

9. In a device of the class described, the combination of a radio transmitter arranged to transmit a carrier wave of substantially constant frequency, a manual control member disposed adjacent the transmitter, an audio frequency oscillator, means connected to said manual control member for causing the output of said oscillator to modulate the carrier wave of the transmitter during the time the manual control member is being adjusted from one predetermined position to another, a radio receiver adapted to receive the carrier wave of the transmitter, a controlled member, a substantially constant speed motor arranged to control the actuation of said controlled member, and means coupled to the output circuit of said receiver for causing the energization of said motor.

10. The combination as set forth in claim 9, in which the means to cause the output of the oscillator to modulate the carrier wave comprises an impedance, and a relay device arranged to short circuit said impedance.

11. In a radio control system, the combination of a radio transmitter arranged to transmit a carrier wave of a single frequency, a first source of audio frequency oscillations arranged to modulate at an audio frequency the output of the transmitter, a second source of audio frequency oscillations arranged to modulate at an audio frequency different than the frequency of said first source the output of the transmitter, a radio receiver for receiving the transmitted carrier wave, at least two controlled members coupled to the output of the receiver, and each being movable about a neutral position, means responsive to the reception of a carrier wave modulated by oscillations of said first source for rotating one of said controlled members, means responsive to the reception of a carrier wave modulated by the oscillations of said second source for rotating the other of said controlled members, a single switching device connected to said sources of oscillations and arranged to stop the modulation of the carrier wave by both of said sources of oscillations, and means for automatically returning each of said controlled members into its neutral position in response to the operation of said switching device.

12. In a device of the class described, the combination of a radio transmitter arranged to transmit a carrier wave of substantially constant frequency, a control member near the transmitter, means for modulating the output of the transmitter at a first audio frequency in response to the adjustment of the control member in one direction, means for modulating the output of the transmitter at a second audio frequency in response to the adjustment of the control member in a different direction, a radio receiver for receiving the transmitted carrier wave, a controlled member, and means coupled to the output circuit of the receiver arranged to move the controlled member in one direction in response to currents of the first audio frequency and to move it in an opposite direction in response to currents of the second audio frequency, said means comprising a pair of motors, one motor being arranged to actuate the controlled member in one direction and the other motor being arranged to actuate it in the opposite direction.

13. In a device of the class described, the combination of a radio transmitter arranged to transmit a carrier wave of substantially constant frequency, a control member near the transmitter, means for modulating the output of the transmitter at a first audio frequency in response to the adjustment of the control member in one direction, means for modulating the output of the transmitter at a second audio frequency in response to the adjustment of the control member in a different direction, a radio receiver for receiving the transmitted carrier wave, a controlled member, and means coupled to the output circuit of the receiver arranged to move the controlled member in one direction in response to currents of the first audio frequency and to move it in an opposite direction in response to currents of the second audio frequency, said means comprising a differential gearing having two input shafts and an output shaft connected to the controlled member, and two motors so connected to said input shafts as to rotate them in opposite directions.

14. In a device of the class described, the combination of a radio transmitter arranged to transmit a carrier wave of substantially constant frequency, a control member near the transmitter, means for modulating the output of the transmitter at a first audio frequency in response to the adjustment of the control member in one direction, means for modulating the output of the transmitter at a second audio frequency in response to the adjustment of the control member in a different direction, a radio receiver for receiving the transmitted carrier wave, a controlled member, and means coupled to the output circuit of the receiver arranged to move the controlled member in one direction in response to currents of the first audio frequency and to move it in an opposite direction in response to currents of the second audio frequency, said means comprising a differential gearing having two input shafts and an output shaft connected to the controlled member, and two impulse motors arranged to rotate said input shafts in opposite directions at substantially the same velocity.

15. In a device of the class described, the combination of a radio transmitter arranged to transmit a carrier wave of substantially constant frequency, a control member near the transmitter, means for modulating the output of the transmitter at a first audio frequency in response to the adjustment of the control member in one direction, means for modulating the output of the transmitter at a second audio frequency in response to the adjustment of the control member in a different direction, a radio receiver for receiving the transmitted carrier wave, a controlled member, and means coupled to the output circuit of the receiver arranged to move the controlled member in one direction in response to currents of the first audio frequency and to move it in an opposite direction in response to currents of the second audio frequency, said means comprising a torque amplifier having an output shaft connected to the controlled member and an input shaft, a differential gearing having an output shaft and a pair of input shafts, the output shaft of the differential gearing being connected to the input of the torque amplifier, and means for rotating the input shafts of the differential gearing in opposite directions.

EMIL W. DINGA.